(12) United States Patent
Saito

(10) Patent No.: US 6,520,882 B2
(45) Date of Patent: Feb. 18, 2003

(54) SHIFT CONTROL SYSTEM FOR AUTOMATIC TRANSMISSION

(75) Inventor: Yuji Saito, Shizuoka (JP)

(73) Assignee: Jatco Transtechnology Ltd., Fuji (JP)

( * ) Notice: Subject to any disclaimer, the term of this patent is extended or adjusted under 35 U.S.C. 154(b) by 0 days.

(21) Appl. No.: 09/953,968

(22) Filed: Sep. 18, 2001

(65) Prior Publication Data

US 2002/0037784 A1 Mar. 28, 2002

(30) Foreign Application Priority Data

Sep. 18, 2000 (JP) ........................................ 2000-282321

(51) Int. Cl.[7] ............................................. F16H 61/04
(52) U.S. Cl. ...................................... 475/127; 477/155
(58) Field of Search ............................... 475/116, 120, 475/121, 127; 477/155

(56) References Cited

U.S. PATENT DOCUMENTS

| | | | | |
|---|---|---|---|---|
| 5,468,198 A | * | 11/1995 | Holbrook et al. | 477/143 |
| 5,853,349 A | * | 12/1998 | Shimada et al. | 477/155 |
| 5,913,748 A | * | 6/1999 | Takiguchi | 477/148 |
| 6,149,548 A | * | 11/2000 | Holbrook et al. | 477/143 |

FOREIGN PATENT DOCUMENTS

| | | |
|---|---|---|
| JP | 7-286663 | 10/1995 |

OTHER PUBLICATIONS

U.S. patent application Ser. No. 09/954,298, Saito, filed Sep. 18, 2001.
U.S. patent application Ser. No. 09/953,895, Saito, filed Sep. 18, 2001.
U.S. patent application Ser. No. 09/953.969, Saito, filed Sep. 18, 2001.
U.S. patent application Ser. No. 09/953,966, Saito, filed Sep. 18, 2001.
U.S. patent application Ser. No. 09/953,967, Saito, filed Sep. 18, 2001.
U.S. patent application Ser. No. 09/953,972, Saito, filed Sep. 18, 2001.
U.S. patent application Ser. No. 09/953,937, Saito, filed Sep. 18, 2001.
U.S. patent application Ser, No. 09/953,936, Kato, filed Sep. 18, 2001.
U.S. patent application Ser. No. 09/953,893, Tanaka et al., filed Sep. 18, 2001.
U.S. patent application Ser. No. 09/954,019, Saito, filed Sep. 18, 2001.
U.S. patent application Ser. No. 09/936,811, Murasugi et al., filed Sep. 18, 2001.
U.S. patent application Ser. No. 09/954,017, Murasugi et al., filed Sep. 18, 2001.

* cited by examiner

Primary Examiner—Sherry Estremsky
(74) Attorney, Agent, or Firm—Foley & Lardner

(57) ABSTRACT

An automatic transmission controller carries out (a) changing a control for engaging the engaging-side frictional element between in a first condition in which a speed of progression in the shift is managed mainly in accordance with a volume of the hydraulic fluid to be supplied to the engaging-side frictional element itself and in a second condition in which the shift progresses regardless of the volume of hydraulic fluid to be applied to the engaging-side frictional element itself; and (b) accomplishing a volume control for the engaging-side frictional element from a timing immediately after a decision of the shift under a command hydraulic pressure of the hydraulic fluid to be supplied to the engaging-side frictional element in the second condition, the command hydraulic pressure having a lower limit value for securing that a piston stroke of the engaging-side frictional element completes within a predetermined time.

5 Claims, 7 Drawing Sheets

FIG.2

| | R/C | H/C | L/C | LR/B | L/OWC | 2-4/B |
|---|---|---|---|---|---|---|
| 1st | | | ◯ | (◯) | ◯ | |
| 2nd | | | ◯ | | | ◯ |
| 3rd | | ◯ | ◯ | | | |
| 4th | | ◯ | | | | ◯ |
| Rev | ◯ | | | ◯ | | |

SHIFT CONTROL SYSTEM FOR AUTOMATIC TRANSMISSION

BACKGROUND OF THE INVENTION

1. Field of the Invention

The present invention relates to improvements in a shift control system for an automatic transmission, and more particularly, to a shift control system for an automatic transmission, which has a plurality of frictional elements and can shift the transmission by engaging at least a frictional element by increasing the pressure of a hydraulic fluid.

2. Description of the Prior Art

An automatic transmission is so constructed as to determine a power transmission path (shift gear or stage) of a gear shift system by selectively actuating a plurality of frictional elements, such as clutches and brakes, based on the fluid pressure and change the shift by switching the frictional elements to be actuated. It is well known that in an automatic transmission having a plurality of frictional elements, a shift for the transmission can be made by engaging at least a frictional element by increasing the pressure of a hydraulic fluid.

As discussed after, a shift control of the present invention can be adapted for an automatic transmission which has one or more frictional elements to be engaged (the number of engaging-side frictional elements may be equal to or greater than one, and a releasing-side frictional element may not be required or the number of releasing-side frictional elements may be equal to or greater than two), and is not limited to a so-called interchange shift which has a single releasing-side element and a single engaging-side element (also called a 1-to-1 interchange shift). The background of the invention will become apparent from the following description of the exemplified case of automatic transmission. In case of such a shift, an automatic transmission makes its shift through a so-called interchange of frictional elements, in which one frictional element is released by reducing the hydraulic (fluid) pressure while the other frictional element is engaged by increasing the hydraulic fluid pressure.

Note that a frictional element to be switched to a released state from an engaged state at the time of carrying out the interchange shift is called a releasing-side frictional element and its hydraulic fluid pressure to be applied to the frictional element is called a releasing-side hydraulic (fluid) pressure, and that a frictional element to be switched to an engaged state from a released state is called an engaging-side frictional element and its hydraulic fluid pressure to be applied to the frictional element is called an engaging-side hydraulic (fluid) pressure.

In the case of the interchange shift, for example, at the time of executing the interchange shift, the interchange shift can be accomplished under releasing/engaging control in which the engaging-side frictional element is engaged by increasing the engaging-side hydraulic fluid pressure while the releasing side frictional element is being released by reducing the releasing-side hydraulic fluid pressure. As a engaging-side control (for engaging-side frictional element), it is known to independently and sequentially carry out a so-called piston stroke control and a so-called volume control, as disclosed in Japanese Patent Provisional Publication No. 7-286663(Document 1) which is referred hereinafter as a conventional technique. Accordingly, a control needed for the piston stroke and a control needed to secure a volume (of hydraulic fluid to be supplied to the frictional element) are performed independently (it is possible to independently perform learning etc.)

In consideration of the following points, therefore, a shift control for an automatic transmission still has been required to be improved.

(A) Because the progress of the shift can not be controlled on the engaging-side (frictional element) in drive-down (Driv Down) shift, the timing at which the volume is needed is determined irrespective of the volume of the hydraulic fluid to be supplied to the engaging-side frictional element itself. Depending on the situation, therefore, the volume may become necessary while an engaging-side frictional element is doing a piston stroke; however, it is difficult to deal with such a case.

This will be explained with reference to FIG. 8 which shows the relationship between a turbine speed $N_t$ or the number of rotations (per unit time) of the input shaft of the transmission and the volume needed by the engaging-side frictional element. The progressing speed of an inertia phase is determined mainly by the releasing-side hydraulic pressure (the progress of the inertia phase is managed by controlling the releasing-side frictional element). In this case, however, while a volume (or a necessary volume which is required for carrying out the shift) needed by the engaging-side frictional element is also determined by the degree of the progress of the inertia phase, what timing and when the volume becomes necessary cannot be controlled by the engaging-side hydraulic pressure itself. As the timing at which the engaging-side frictional element needs the volume cannot be controlled by the engaging-side frictional element itself, there may occur the aforementioned situation where it is difficult to provide the necessary volume.

(B) Unless the end of the piston stroke is detected by some kind of means, a wasteful time is certainly produced. It is not therefore possible to cope with the shift that demands, for example, a high response (such as the shift made upon a drive-down).

FIG. 9 is a diagram which is also referred to in the later description of an embodiment of the present invention. As apparent from this diagram, linkage between the piston stroke control and the volume control is needed and leads to a wasteful time. (The control to link the two controls causes a lag.) The necessity of such a link control means that it is difficult to secure the necessary volume promptly after the piston stroke ends. The piston stroke control may be carried out using a timer. The use of a timer inevitably requires a certain extra or surplus time, thus producing a wasteful time. (The extra time causes a lag.)

(C) A supplementary explanation of the aforementioned problems will now be given. From the viewpoint of the performances or the like needed for the engaging-side hydraulic pressure for the drive-down shift, the following points are to be considered.

(1) In the latter half of the inertia phase, the volume becomes necessary.

(2) As the degree of the progress of the inertia phase cannot be controlled by the engaging-side frictional element (as discussed referring to FIG. 8, the degree of the progress of the inertia phase is controlled in the drive-down shift mainly by the releasing-side hydraulic pressure), the time when the volume becomes necessary is irrelevant to the status of the engaging-side frictional element.

(3) As the control is used in the drive-down shift, the unnecessary lag is ideally not allowable and the volume is to be increased to the required level as fast as possible.

If shift control depends on the control of the engaging-side frictional element as shown in FIG. 9 even in the case of FIG. 8 where the shift progresses irrespective of the engaging-side volume (or the volume of the hydraulic fluid to be supplied to the engaging-side frictional element), this case is similar to the situation (2) so that the volume may become necessary during piston stroke control but cannot be coped with. Further, because the employment of a timer control (using the timer) to end the piston stroke inevitably produces a wasteful time (see FIG. 9), the timer control is not suitable for the shift that demands a response for the reason given in the paragraph (3).

It is therefore difficult to both surely finish the piston stroke within an intended time even if it is unclear when the volume becomes necessary and promptly secure the necessary volume after the completion of the piston stroke at the same time.

(D) It is desirable that even when the shift progresses irrespective of the engaging-side volume, the completion of the piston stroke and securing of the necessary volume are to be satisfied at the same time. It is also desirable to be able to effectively cope with the shift that demands a high response, surely finish the piston stroke within the intended time and secure the necessary volume immediately upon completion of the piston stroke.

SUMMARY OF THE INVENTION

Accordingly, it is an object of the present invention to provide an improved shift control system for an automatic transmission which is improved in consideration of the above-described points as well as points that will be discussed later and which can adequately shift the transmission by engaging at least an engaging-side frictional element by increasing the pressure of a hydraulic fluid.

Another object of the present invention is to provide an improved shift control system for an automatic transmission, which provides an engaging-side (frictional element) control that can effectively cope with a down shift demanding a quick response and other shifts, and can allow the piston stroke to surely be finished within an intended time, while securing a necessary volume of a hydraulic fluid to be supplied to the engaging-side frictional element immediately after completion of the piston stroke of the engaging-side frictional element.

An aspect of the present invention resides in a shift control system for an automatic transmission. The shift control system comprises a plurality of frictional elements including at least an engaging-side frictional element which is able to make a shift for the automatic transmission upon being engaged by increasing a hydraulic pressure of a hydraulic fluid to be supplied to the engaging-side frictional element. Additionally, a controller is provided to be programmed to carry out (a) changing a control for engaging the engaging-side frictional element between in a first condition in which a speed of progression in the shift is managed mainly in accordance with a volume of the hydraulic fluid to be supplied to the engaging-side frictional element itself and in a second condition in which the shift progresses regardless of the volume of hydraulic fluid to be applied to the engaging-side frictional element itself; and (b) accomplishing a volume control for the engaging-side frictional element from a timing immediately after a decision of the shift under a command hydraulic pressure of the hydraulic fluid to be supplied to the engaging-side frictional element in the second condition, the command hydraulic pressure having a lower limit value for securing that a piston stroke of the engaging-side frictional element completes within a predetermined time.

Another aspect of the present invention resides in a shift control system for an automatic transmission. The shift control system comprises a plurality of frictional elements including at least an engaging-side frictional element which is able to make a shift for the automatic transmission upon being engaged by increasing a hydraulic pressure of a hydraulic fluid to be supplied to the engaging-side frictional element. Additionally, a controller is provided to be programmed to carry out (a) determining that the automatic transmission is in a first condition in which a speed of progression in the shift is managed mainly in accordance with a volume of the hydraulic fluid to be supplied to the engaging-side frictional element itself; (b) determining that the automatic transmission is in which the shift progresses regardless of the volume of hydraulic fluid to be applied to the engaging-side frictional element itself; (c) applying a first control and a second control for engaging the engaging-side frictional element respectively in the first condition and the second condition, the first and second controls being different from each other and changed over from one to the other; (d) setting a lower limit value of a command hydraulic pressure of the hydraulic fluid to be supplied to the engaging-side frictional element, the engaging-side frictional element is engaged under the command hydraulic pressure, the lower limit value securing that a piston stroke of the engaging-side frictional element completes within a predetermined time; and (e) accomplishing a volume control for the engaging-side frictional element from a timing immediately after a decision of the shift under the command hydraulic pressure of the hydraulic fluid in the second condition.

According to the invention, the automatic transmission has a plurality of frictional elements and can shift the transmission by engaging at least an engaging-side frictional element by increasing the pressure of a hydraulic fluid, and the shift control system switches a control for the engaging-side frictional element between a first case or condition where the progressing speed of shift is controlled mainly by the volume of the hydraulic fluid to be supplied to the engaging-side frictional element itself and a second case or condition where the shift progresses irrespective of the volume of the engaging-side frictional element itself. In the second case, the shift control system executes the control on the engaging-side frictional element in such a way as to perform the volume control immediately after the shift is determined, while taking a command pressure for guaranteeing the completion of the piston stroke within a predetermined time as a lower limit value.

It is therefore possible to properly change the control for the engaging-side frictional element between the first and second cases, thus ensuring a delicate control to improve the applicability, and to guarantee the completion of the piston stroke within a predetermined time and promptly increase the hydraulic fluid pressure to or above the hydraulic pressure for the necessary volume upon completion of the piston stroke at the same time. The increase in hydraulic fluid pressure can realize a shift control that can suitably carry out the shift by engaging the at least an engaging-side frictional element. Note that the invention is not limited to the interchange shift which involves a single release element and a single engaging element. The invention is adaptable if there is at least an engaging-side frictional element to be engaged and is in no way limited to the 1-to-1 interchange shift. (The number of engaging-side frictional elements may be equal to or greater than one, and a releasing-side frictional element may not be required or the number of releasing-side frictional elements may be equal to or greater than two.) The invention is neither limited to a down shifting. The invention can be adapted to the drive up (Driv UP) and coast down (Coast Down) in the first case, and to the coast up (Coast UP) and drive down (Driv Down) in the second case. Because the hydraulic pressure that guarantees the completion of the piston stroke within a predetermined time can be set as a lower limit value at the time of drive-down shift in an embodiment of the invention that will be discussed later, for example, the piston stroke can surely be finished within the intended time. It is also possible to always perform volume control and secure the necessary volume immediately upon completion of the piston stroke.

Demerits or the like of the control method for the engaging-side frictional elements that is employed for the shift in the second case will be additionally discussed below.

The method of executing the volume control from the beginning by using the hydraulic pressure that guarantees the completion of the piston stroke within a predetermined time as a lower limit value has a merit that the necessary volume can be secured immediately upon completion of the piston stroke. By way of contrast, in an automatic transmission of a directly valve-actuating type that does not have a buffer element (accumulator or the like) in the hydraulic circuit, the slop along which the volume increases cannot be controlled thereby causing the volume to be reached the necessary volume at once, thus causing a sudden variation in the torque of the output shaft. Accordingly, even when the necessary volume is small and is reached at once, therefore, the control according to the present invention can be used without causing the ill effect to appear, only when a variation in the then volume is small.

In the first case, because the engaging-side frictional element will cause the shift to progress against the engine torque, the necessary volume during the inertia phase is relatively large. However, in the second case, as the progress of shift is made by the engine torque itself, the volume necessary during the inertia phase is relatively small.

In view of the above, the second case is more suitable as the condition under which the method of executing the volume control from the beginning by using the hydraulic pressure that guarantees the completion of the piston stroke within a predetermined time as a lower limit value is carried out without causing the ill effect.

The present invention is preferably provided with an arrangement in which changing the control is made in accordance with a first state in which a turbine torque of a torque converter is in a drive mode and a second state in which the turbine torque is in a coast mode. With this arrangement, the invention can be embodied adequately and can accomplish the above-described control. In case that the progressing speed of shift is controlled mainly by the volume of the hydraulic fluid to be supplied to the engaging-side frictional element itself, a control switching can be made depending on whether the turbine torque is in drive mode or coast mode only when the shift progresses regardless of the volume of the engaging-side frictional element. It is therefore possible to adequately accomplish the above-described shift by properly changing the control on the engaging-side frictional element in accordance with the turbine torque based switching.

Additionally, the present invention is preferably provided with an arrangement in which a piston stroke control is made before the volume control in the first condition, the piston stroke control being for the engaging-side frictional element and accomplished under a command hydraulic pressure of the hydraulic fluid to be supplied to the engaging-side frictional element. With this arrangement, the invention can be embodied adequately and can accomplish the above-described control. Under this situation, in the first case where the progressing speed of shift is controlled mainly by the volume of the hydraulic fluid to be supplied to the engaging-side frictional element itself, the control on the engaging-side frictional element can be executed in the order of piston stroke control and volume control and the invention can carry out the control on the engaging-side frictional element as the one having such contents.

Further, the present invention is preferably provided with an arrangement in which the controller is programmed to further carry out accomplishing a volume control for the engaging-side frictional element under a command hydraulic pressure of the hydraulic fluid to be supplied to the engaging-side frictional element in the second condition. The command hydraulic pressure has a lower limit value for securing that a piston stroke state of the engaging-side frictional element is maintained in the volume control so as to secure maintenance of the piston stroke state even if a necessary volume of the hydraulic fluid to be supplied to the engaging-side frictional element is reduced. With this arrangement, the invention can be embodied adequately and can accomplish the above-described control. Under this situation, even in the first case, a lower limit value which ensures that the piston stroke state is maintained is so provided during the volume control as to be able to control the shift in such a manner that even when the necessary volume becomes smaller, the piston stroke state is guaranteed. Even when the necessary volume decreases during volume control, therefore, it is possible to ensure that the piston stroke which has been completed once does not return.

BRIEF DESCRIPTION OF THE DRAWINGS

FIG. 2 is a diagram showing the relationship between the shift gears or stages of the automatic transmission and an engaging logic of the frictional elements, used in the shift control system of FIG. 1;

DETAILED DESCRIPTION OF THE INVENTION

Figure 1:
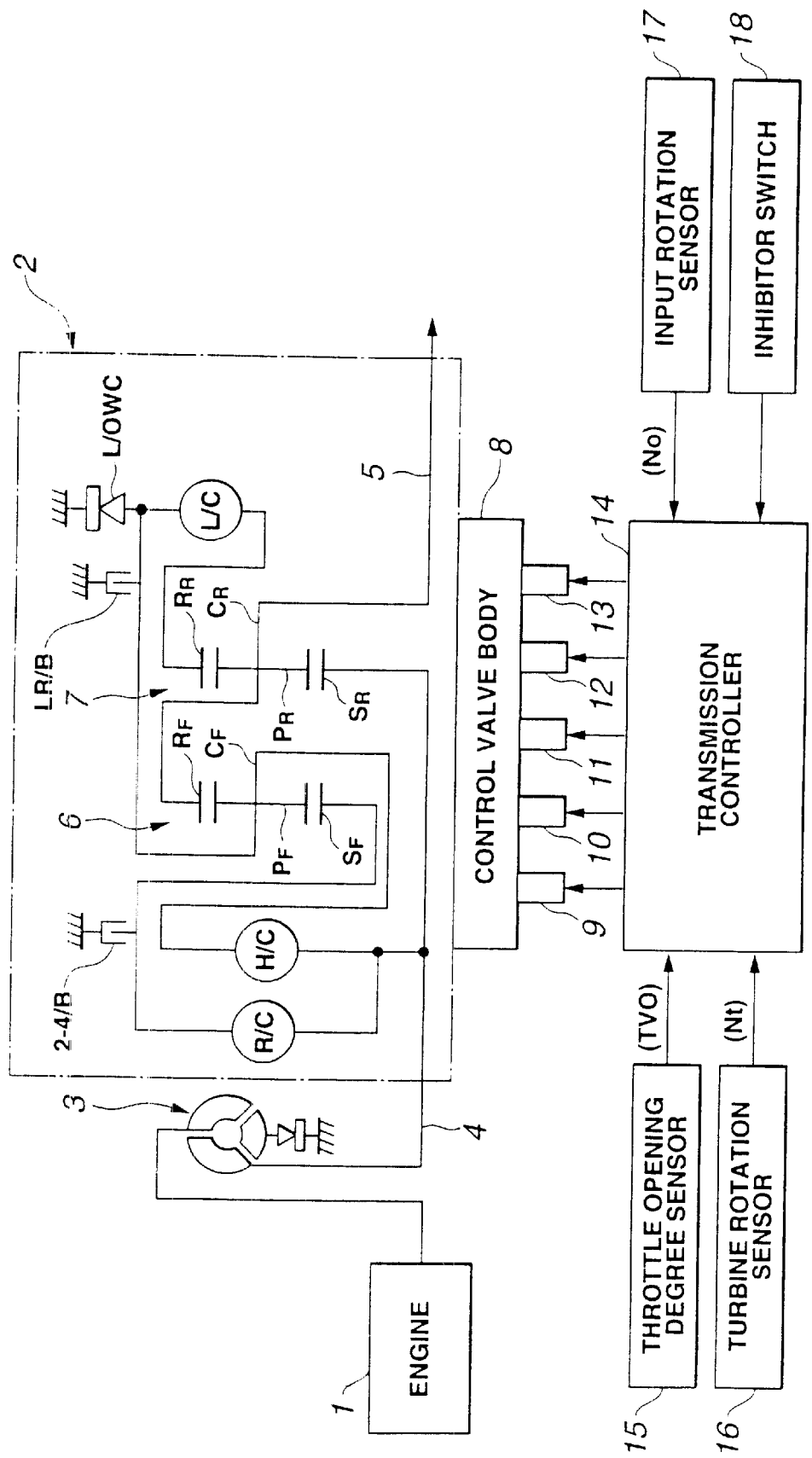
FIG. 1 is a schematic illustration of an embodiment of a shift control system according to the present invention incorporated with an automatic transmission provided to an internal combustion engine of an automotive vehicle.

Referring now to FIGS. 1, an embodiment of a shift control system of an automatic transmission, according to the present invention will be illustrated in combination with an engine 1 and an automatic transmission 2. The engine 1 produces a power output which can be changed under control of a throttle valve (not shown) whose degree of opening increases to the fully opened state from the fully closed state in response to the manipulation of an accelerator pedal (not shown) by a driver as the driver steps down the pedal. The output (rotational) power of the engine 1 is input to an input shaft 4 of the automatic transmission 2 via a torque converter 3. The automatic transmission 2 has a front planetary gear set 6 and a rear planetary gear set 7 mounted on the input shaft 4 and an output shaft 5 in the mentioned order from the side of engine 1. The input and output shaft 4, 5 are coaxially aligned with each other. The planetary gear sets serve as essential component elements of a planetary gear shift mechanism in the automatic transmission 2.

The front planetary gear set 6 closer to the engine 1 is a simple planetary gear set which comprises a front sun gear $S_F$, a front ring gear $R_F$, a front pinion $P_F$ which engages with those gears $S_F$ and $R_F$, and a front carrier $C_F$ which rotatably supports the front pinion $P_F$. The rear planetary gear set 7 located far from the engine 1 is also a simple planetary gear set which comprises a rear sun gear $S_R$, a rear ring gear $R_R$, a rear pinion $P_R$ which engages with those gears $S_R$ and $R_R$, and a rear carrier $C_R$ which rotatably supports the rear pinion $P_R$.

As frictional elements that determine the power transmission line (shift gear or stage) of the planetary gear shift mechanism, a low clutch L/C, a second-fourth gear brake 2–4/B, a high clutch H/C, a low reverse brake LR/B, a low one-way clutch L/OWC and a reverse clutch R/C are provided in correlation with the components of both front planetary gear sets 6 and 7 as follows. The front sun gear $S_F$ can be connected to the input shaft 4 by the reverse clutch R/C as needed and can be fixed by the second-fourth gear brake 2–4/B as needed. The front carrier $C_F$ can be connected to the input shaft 4 by the high clutch H/C as needed. The front carrier $C_F$ inhibits the reverse rotation to the engine rotation by means of the low one-way clutch L/OWC and can be fixed by the low reverse brake LR/B as needed. The front carrier $C_F$ and the rear ring gear $R_R$ can be connected by the low clutch L/C as needed. The front ring gear $R_F$ and the rear carrier $C_R$ are connected to each other and connected to the output shaft 5, and the rear sun gear $S_R$ is engaged to the input shaft 4.

Figure 2:
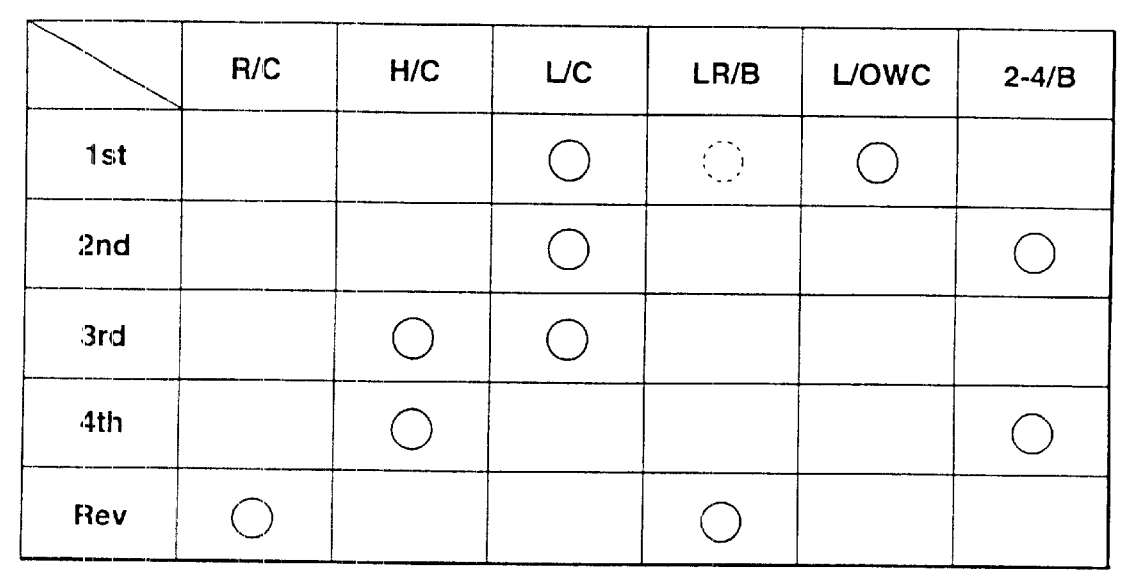

The power transmission line of the planetary gear shift mechanism can have forward shift gears, a forward first (1st), a forward second (2nd), a forward third (3rd) and a forward fourth (4th), and a reverse shift gear (Rev) by the selective hydraulic actuation (engaging or applying) of the frictional elements L/C, 2–4/B, H/C, LR/B and R/C, as indicated by solid circles in FIG. 2, and the self engagement of the low one-way clutch L/OWC as indicated by a solid circle in the diagrams. The hydraulic actuation (engaging or applying) as indicated by a dotted circle in FIG. 2 is the frictional element that is to be actuated when the engine brake is needed.

The engaging logic of the frictional elements L/C, 2–4/B, H/C, LR/B and R/C for shift control as shown in FIG. 2 is realized by a control valve body 8 shown in FIG. 1. Connected in the control valve body 8 are a line-pressure solenoid 9, a low clutch solenoid 10, a second-fourth brake solenoid 11, a high clutch solenoid 12 and a low reverse brake solenoid 13, etc. in addition to a manual valve (not shown).

The line-pressure solenoid 9, when switched ON or OFF, switches a line pressure (as an original pressure) for shift control between high and low pressures. (The original pressure means the line pressure or hydraulic pressure when the frictional element is engaged.) It is assumed that the manual valve (not shown) is manipulated by the driver to a forward drive (D) range position, a reverse drive (R) range position or a park (P or N) range position in accordance with the desired drive mode.

In the D range, with the line pressure treated as the original pressure, the manual valve feeds the line pressure to a predetermined circuit in such a way as to be able to individually control the hydraulic fluid pressures of the low clutch L/C, the second-fourth gear brake 2–4/B, the high clutch H/C and the low reverse brake LR/B under the duty control of the respective low clutch solenoid 10, second-fourth brake solenoid 11, high clutch solenoid 12 and low reverse brake solenoid 13, in which the duty control of the individual solenoids realizes the engaging logic of the first to fourth shifts shown in FIG. 2.

In the R range, the manual valve directly supplies the line pressure to the reverse clutch R/C without depending on the duty control of the individual solenoids, and supplies the low reverse brake LR/B with a hydraulic (fluid) pressure controlled under the duty control of the individual solenoids. The engaging logic for reverse shown in FIG. 2 is realized by engaging and actuating those elements.

In the P or N range, the manual valve does not supply the line pressure to any circuit and sets all the frictional elements in a released state, thereby rendering the automatic transmission in a neutral state.

The ON/OFF control of the line-pressure solenoid 9 and the duty control of the low clutch solenoid 10, the second-fourth brake solenoid 11, the high clutch solenoid 12 and the low reverse brake solenoid 13 are executed by a transmission controller 14. To carry out those controls, the transmission controller 14 receives a signal from a throttle opening degree sensor 15 which detects the degree of opening of a throttle valve, TVO, in the engine 1, a signal from a turbine rotation sensor 16 which detects a turbine speed $N_t$ or the number of output rotations of the torque converter 3 (the number of input rotations of the transmission), a signal from an output rotation sensor 17 which detects the number of rotations, $N_o$, of the output shaft 5 of the automatic transmission 2, and a signal from an inhibitor switch 18 which detects a selected range.

The transmission controller 14 includes a microcomputer and can be so constructed as to include an input detection circuit for receiving input information from associated sensors, switches, etc., an operation circuit or processor, a memory circuit for storing various control programs, such as a control program for shift control and a line pressure control program, which are executed by the operation circuit, operation results and other information, and an output circuit which sends drive control signals to the line-pressure solenoid 9 and the solenoids 10 to 13.

The shift control may include a control (piston stroke control) needed for a piston stroke of a piston of the frictional element, and a volume control for securing a necessary volume of the hydraulic fluid to be supplied to the piston, in a corresponding engaging-side frictional element which is to be engaged as a result of determining the shift. The above corresponding engaging-side frictional element is, for example, the high clutch H/C in the second-to-third shift mode, the second-fourth gear brake 2–4/B in the third-to-second shift mode, the second-fourth gear brake 2–4/B in the third-to-fourth shift mode or the low clutch L/C in the fourth-to-third shift mode, as apparent from FIG. 2. The above piston stroke control is a control for causing the piston of the frictional element to make its stroke to take its state obtained immediately before a torque capacity is provided. In the volume control, the necessary volume is a volume of the hydraulic fluid (to be supplied to the cylinder of the frictional element) required for the shift in the automatic transmission.

A description will now be given of automatic transmission in the D range according to the invention. The transmission controller 14 executes a control program (not shown) and searches an adequate shift gear required in the current drive state from the throttle opening degree TVO and the number of output rotations $N_o$ (or a vehicle speed) of the transmission based on a map for scheduled shift.

Next, the transmission controller 14 determines if the shift gear currently selected matches with an adequate shift gear. When there is no match, the transmission controller 14 generates a shift command to change the hydraulic fluid pressure of the frictional element for the shift under the duty control of the individual solenoids 10–13 in such a way as to shift to the adequate shift gear (up shift or down shift) or switch between engaging and releasing of that frictional element based on an engaging logic table in FIG. 2.

In controlling the hydraulic fluid pressure in the case of the down shift, for example, the transmission controller 14 executes the control in consideration of the following processes in providing (producing) a command value (or command pressure for engaging) of the frictional element to be engaged in the down shift.

In the down shift:

In this mode, selective switching control is executed in such a way as to change a control on the engaging-side (frictional element) between the following two cases I and II.

I: Case or condition where the shift progressing speed is controlled mainly by the volume of the hydraulic fluid to be supplied to the engaging-side frictional element itself.

II: Case or condition where the shift progressing speed is controlled irrespective of the volume of the hydraulic fluid to be supplied to the engaging-side frictional element itself.

Although the following description is given of the exemplified cases of the "down shift" and the "interchange shift", those cases are merely examples and the invention may be adapted to the "up shift" and shift different from the interchange shift as has already been mentioned.

Figure 6:
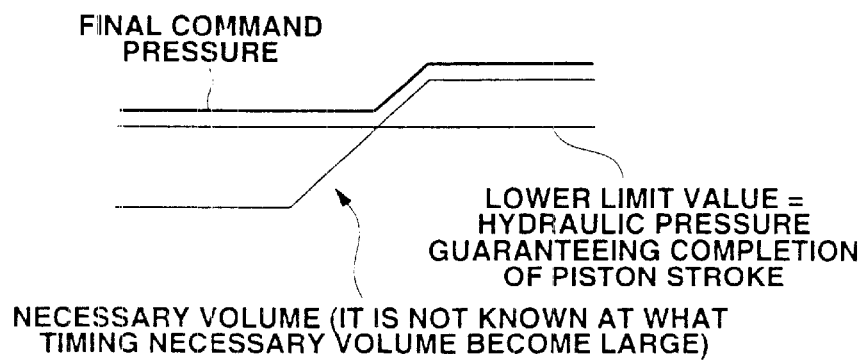
FIG. 6 is an explanatory graph similar to FIG. 5A but showing a control manner of the final command pressure in connection with the necessary volume and the lower limit value for securing the termination of the piston stroke in the engaging-side frictional element, used in the shift control system of FIG. 1.

It is preferable that while, in the case I, the piston stroke control and the volume control may be executed in the named order as well known in a conventional technique; and in the case II where it is not possible to know when the volume of the hydraulic fluid becomes necessary, the shift control can be made to perform the volume control immediately after making a decision of the shift, based on the command pressure that guarantees "the completion of the piston stroke within a predetermined time" as a lower limit value (see FIG. 6).

It is preferable that the selective control switching between the cases I and II is to be performed depending on whether the turbine torque is in a drive mode or in a coast mode. It is further preferable that even in the case I, the transmission controller 14 provides the "lower limit value which ensures that the piston stroke state (or state where the piston stroke has been completed) is maintained" during the volume control so that the piston stroke which has been completed once is prevented from returning even when the necessary volume decreases (see FIG. 7). This control can always guarantee the piston stroke state even when the necessary volume falls due to, for example, a change or variation in the throttle opening degree TVO or the like.

Figure 3:
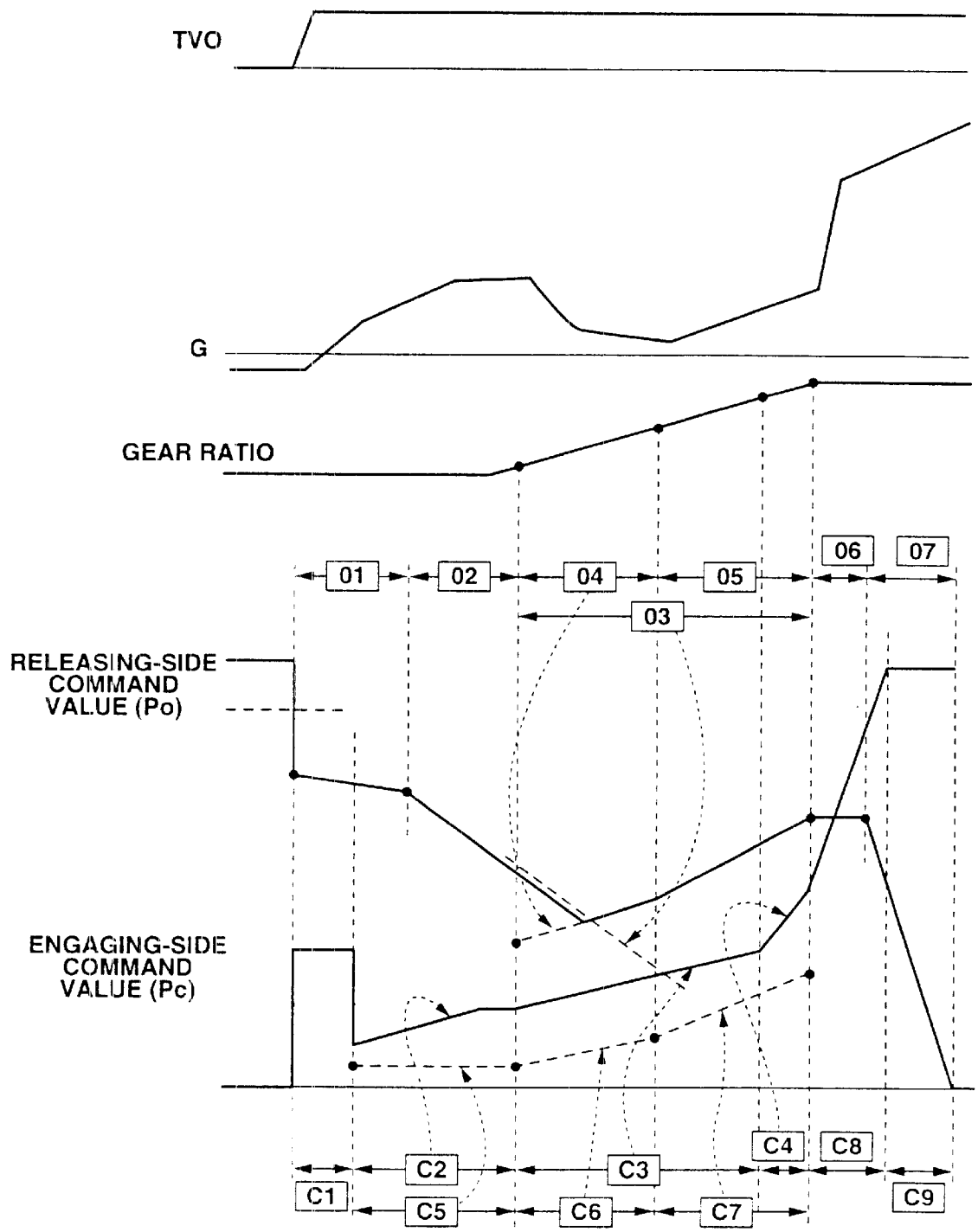
FIG. 3 is a time chart showing an example of the time series change of a releasing-side command value (pressure) and an engaging-side command value (pressure) and the like, used in the shift control system of FIG. 1 and in case of carrying out an interchange shift in a down-shift mode.

Referring now to FIG. 3 and the subsequent diagrams, a description will now be given of the down-shift interchange shift which releases one frictional element by reducing the hydraulic (fluid) pressure and engages the other frictional element by increasing the hydraulic (fluid) pressure. When it is the down (drive down) shift mode originated from the manipulation of the acceleration pedal while the prime mover, such as the engine, is in operation, the transmission controller 14 can provide a command value or pressure $P_o$ of the releasing-side hydraulic (fluid) pressure for the frictional element to be released, and a command value or pressure $P_c$ of the engaging-side hydraulic fluid pressure for the frictional element to be engaged as illustrated in FIG. 3.

FIG. 3 exemplifies the transition of changes in the releasing-side command value ($P_o$) and engaging-side command value ($P_c$) over a period from the instant of the generation of a shift command to the end of the shift control, including the transition of changes in the throttle opening degree TVO, G (G waveform) and gear ratio. With regard to the command value $P_c$ of the engaging-side hydraulic fluid pressure, FIG. 3 exemplifies control contents in the case II or control contents about the command pressure (for the engaging-side frictional element) in the case where the degree of progress of the inertia phase cannot be controlled by the engaging-side frictional element (in the drive down shift, the degree of progress of the inertia phase is controlled mainly by the releasing-side hydraulic pressure).

The following will discuss the basic characteristics, aims and so forth of control periods O1 to O7 with the releasing-side frictional element and control periods C1 to C9 with the engaging-side frictional element.

To begin with, the command value $P_c$ for the engaging-side hydraulic fluid pressure will be discussed.

C1 (Control) Period

During the C1 period after generation of a shift command (down-shift command), the command value PC is set at a high pre-charge pressure to finish the piston stroke of the engaging-side frictional element as quickly as possible. This period controls the progress of the piston stroke.

C2 to C4 (Control) Periods

These periods control the progress of the piston stroke. The intention is to surely finish the piston stroke before the inertia phase ends even in consideration of unevenness, an increase in flow resistance in a hydraulic fluid line caused owing to a low oil temperature and so forth.

<<In the shift that is originated from the driver's stepping down the acceleration pedal as in this condition, it is necessary to finish or complete the inertia phase within a time period over which the driver does not feel any lag with respect to the shift, so that it is guaranteed to complete the piston stroke at least within that period.>>

In the shown case where the control C1 provides a high pre-charge pressure, a shock occurs if this pre-charge pressure is kept in a period following the C1 period. Therefore, the command value $P_c$ is temporarily made lower than the pre-charge pressure and is gradually increased in the subsequent periods C2, C3 and C4 in the named order to ensure that the piston stroke surely ends within a predetermined time even there are a looseness-canceling amount of the frictional element, unevenness in hydraulic pressure and so forth.

Basically, this control can permit the engaging-side frictional element to surely finish the piston stroke within a predetermined time and to begin to have the necessary volume required for engaging of the frictional element within a predetermined time.

C5 to C7 (Control) Periods

This is the control to guarantee the necessary volume of the engaging-side frictional element.

<<The control has such an intention that the volume of the hydraulic fluid to be supplied to the engaging-side frictional element at the end of the inertia phase becomes a volume which cooperates with the volume of the hydraulic fluid to be supplied to the releasing-side frictional element to prevent racing. (The hydraulic pressure in the process is not so important.>>

<<The command pressure under this control may not cause the piston stroke to finish or complete within the intended or required time. Therefore, the command values are compared between the C2 to C4 controls and the C5 to C7 controls, upon which the larger hydraulic pressure (command value) is output to ensure the completion of the piston stroke. That is, in case that the hydraulic fluid in a volume (pressure) larger than the command pressure required for completion of the piston stroke, the result of the calculation of the C2 t C4 controls becomes the command pressure. In case that the piston stroke cannot be completed within the required time with the hydraulic pressure corresponding to the volume (of the hydraulic fluid) required for the shift, the result of the calculation of the C5 to C7 controls becomes the command pressure.>>

The parallel (simultaneous) execution of both the calculations are made, and then determination of a final command pressure ($P_c$) based on the result of comparison of the calculation results is made. This will be specifically discussed later with reference to a flowchart (FIG. 4) for a routine for calculating the down shift engaging command pressure.

The term "racing" or "race" indicates the state in which the gear ratio has exceeded a gear ratio obtained after the shift and been transferred to a lower gear ratio in the down shift mode (this is common also in the following description).

C8 (Control) Period

After the inertia phase terminates, the hydraulic pressure is increased to a maximum pressure MAX (the line pressure as the original pressure=the line pressure or hydraulic pressure obtained when the frictional element is engaged.)

<<Normally, the pressure may be increased to the maximum pressure MAX at a stretch. However, such a sudden pressure increase produces a large shock in an unlikely event of occurrence of racing. Accordingly, the hydraulic pressure is increased along a gradual slope.>>

C9 (Control) Period

This period holds the engaging-side hydraulic pressure at the maximum level MAX.

<<The maximum pressure MAX is maintained until the O6 to O7 controls for the releasing-side frictional element are completed, thus awaiting the completion of the shift control.>>

The command value $P_o$ for the releasing-side hydraulic fluid pressure will now be discussed.

O1 (Control) Period

The command value $P_o$ is stepwise reduced to a predetermined value in order to secure a release response of the releasing-side frictional element since the instant the shift command was generated.

The hydraulic pressure is lowered to a level of "a hydraulic pressure at which the inertia phase is expected to start" + "a hydraulic pressure for a margin set in consideration of unevenness or the like", so that after the control enters the O2 control, the inertia phase starts in a proper time.

The "proper time" is a time which does not bother the driver with a lag or a time which secures a preparation period for the transition to the inertia phase without causing a sudden change in the releasing-side hydraulic pressure in order to ensure the controllability of the hydraulic pressure of the releasing-side frictional element during the inertia phase.

O2 (Control) Period

To search the hydraulic pressure at which the inertia phase starts, the hydraulic pressure is reduced along a slope. (The inertia phase is initiated as the clutch starts slipping when the volume (of the hydraulic fluid) in the releasing-side frictional element falls and overcome by the turbine torque.)

<<When the slope is too gentle, an unevenness in the timing of starting the inertia phase becomes large with respect to the unevenness in hydraulic pressure. When the slope is too sharp, the progress of shift after the initiation of the inertia phase becomes faster (in O4 and O5 controls, the response of the hydraulic pressure is too slow to finish the piston stroke), so that when the difference between turbine (rotational) speeds before and after the shift is small, the piston stroke on the engaging-side does not end in time, causing racing.>>

O3 (Control) Period

After the initiation of the inertia phase is detected, the hydraulic pressure at the time the initiation of the inertia phase is detected is linked to the hydraulic pressure that is produced in the O4 and O5 controls.

<<In order to prevent the hydraulic pressure from changing stepwise at the time the initiation of the inertia phase is detected, the hydraulic pressure in the O3 control is compared with the hydraulic pressure in the O4 and O5 controls; and then a larger hydraulic pressure is output. Accordingly, the control is automatically switched to the O4 and O5 controls when the hydraulic pressure at the time of detection falls below the hydraulic pressure that is needed according to the intention of the O4 and O5 controls.>>

Specifically, the hydraulic pressure is reduced along a slope similar to that of the O2 control. A larger one of the reduced hydraulic pressure and the hydraulic pressure obtained by the O4 and O5 controls is output upon comparison between the hydraulic pressure determined from the O3 control and the hydraulic pressure determined from the O4 and O5 control.

O4 and O5 (Control) Periods

The intention is to provide soft landing of the rotation of the turbine when the inertia phase ends, by delaying the progress of shift by providing the hydraulic pressure with a volume (of the hydraulic fluid).

<<As a rate of change in rotation of the turbine at the time the inertia phase ends becomes smaller, the amount of the absorbed inertia decreases thereby making a shock smaller, even when the engaging timing on the engaging-side frictional element is deviated.>>

Providing the hydraulic pressure with a volume (of the hydraulic fluid) reduces a so-called pulling torque (which means a drastic change in output shaft torque in a deceleration direction) that is generated as the engaging-side frictional element has the of the hydraulic fluid. (The volume of the hydraulic fluid in the releasing-side frictional element during the inertia phase acts on the output shaft torque at the positive side.)

O6–O7 (Control) Periods

To prevent the barrier or wall feeling after the inertia phase ends, the releasing-side hydraulic pressure is maintained so as to chamfer or round the torque In an unlikely event of occurrence of racing after the end of the inertia phase, the releasing-side hydraulic pressure is kept for a while to prevent a racing at a stretch, thus reducing an increase rate in the number of rotations.

In the O7 period, the hydraulic pressure is reduced by a predetermined rate so that the final command value is set to 0 ($P_o=0$) as illustrated.

The "barrier or wall feeling" indicates a state where the forward or reverse acceleration of a vehicle suddenly rises (in the drive-down mode, it means that a low acceleration state in the inertia phase suddenly reaches a higher acceleration state obtained after the completion of shift, after the inertia phase ends).

Figure 4:
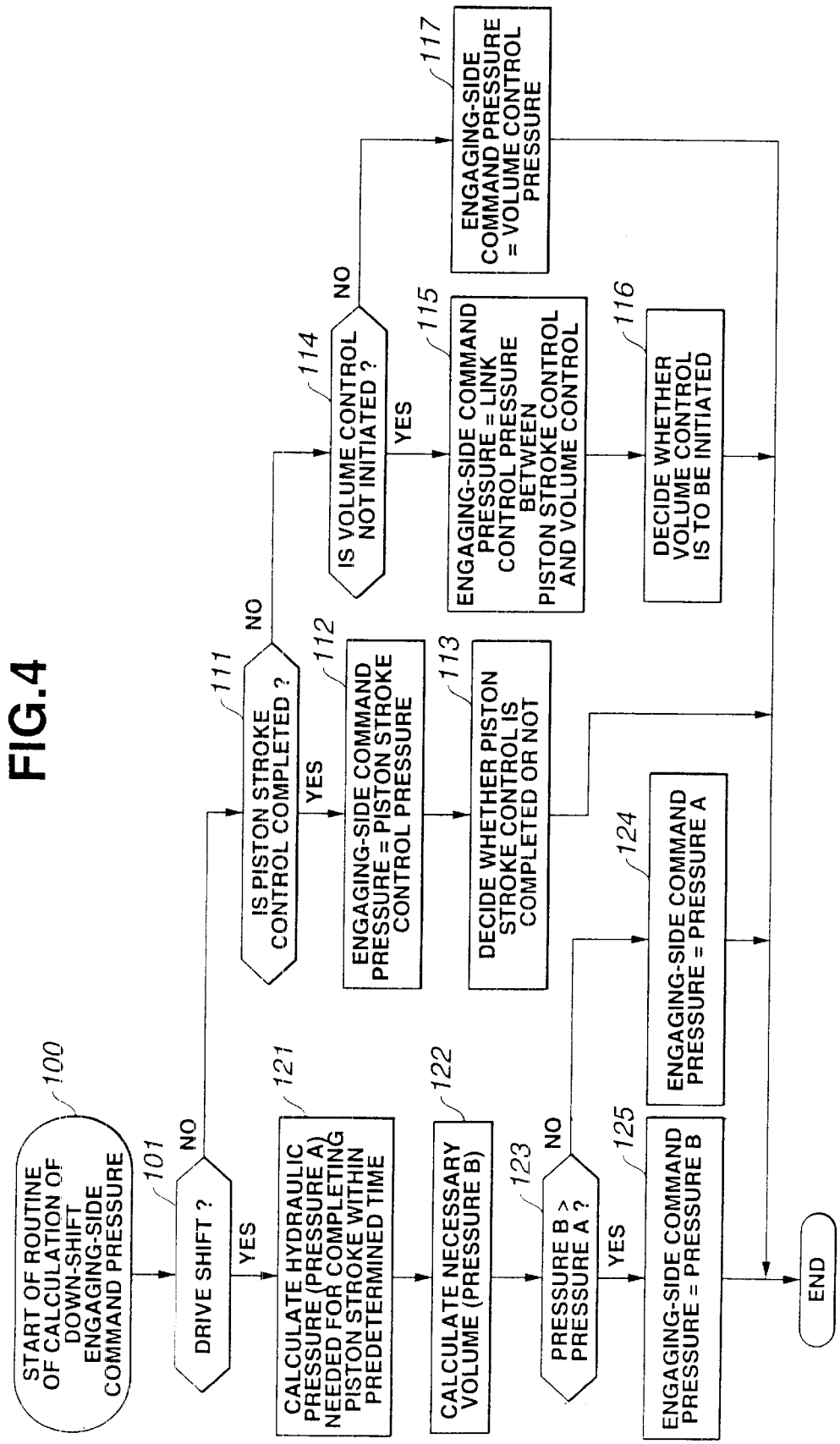
FIG. 4 is a flowchart showing an example of routine for calculating the engaging-side command pressure in the down-shift mode, used in the shift control system of FIG. 1.

FIG. 4 exemplifies a control program flowchart for a routine to calculate the engaging-side command pressure (setting the command value for the engaging-side hydraulic fluid pressure) including a process of selectively switching the engaging-side control (or the control for engaging-side frictional element) that is executed in the down-shift mode by the transmission controller 14. The routine will be specifically described with reference to FIG. 4 and the subsequent drawings. This program can be run by a regular interruption made every given time.

In the control program shown in FIG. 4, the routine of calculating a command pressure for engaging-side frictional element in down-shift is initiated in step 100. In this exemplified program, at step 101, it is determined which one of the above-mentioned cases I and II corresponds to the current state of the transmission. According to the result of this determination, a control for the engaging-side frictional element is changed. For example, the process of the step 101 determines whether or not the present state corresponds to a drive (Driv) shift. This determination can be made by deciding whether the turbine torque (torque of the turbine of the torque converter) is positive or negative in the present state of the transmission. This decision can be made by checking whether the turbine torque is in drive mode or coast mode. This can allow the control to be switched or changed in accordance with the drive down (mode) or the coast down (mode).

When the result of the decision in step 101 is negative (NO), the present state is determined to be the case I (coast down) and a sequence of processes in the routine starting at step 111 is selected. When the result of the decision in step 101 is affirmative (YES), the case is determined to be the case II (drive down) and a sequence of processes in the routine starting at step 121 is selected.

When the sequence of processes starting at step 111 is selected, in the exemplified program, it is determined first whether or not the piston stroke control has not been finished or terminated. When the result of the decision is YES, the command value ($P_c$) for the engaging-side hydraulic fluid pressure is set equal to a piston stroke control pressure (pressure for the piston stroke control) in step 112 and it is determined in step 113 if the piston stroke control has ended.

When it is determined that the piston stroke control has ended, the process goes to step 114 from step 111 in the next and later loops. In step 114, it is determined whether or not the volume control has not been initiated. When the result of the decision is YES, the command value for engaging is set equal to a link control pressure for the transition from the piston stroke control to the volume control in step 115, and it is determined in next step 116 if the volume control has been started or initiated. When it is determined that the volume control has started, the process proceeds to step 117 from step 114 in the next and later loops. At the step 117, the command value ($P_c$) for the engaging-side hydraulic fluid pressure is set equal to a volume control pressure (pressure for the volume control) and the volume control is initiated.

A supplemental description will be given of the contents of piston stroke control or the like in the control for the engaging-side element, carried out according to the sequence of processes starting at step 111.

In the piston stroke control, the piston stroke is finished as fast as possible but in such a way that a sudden change in volume, which is caused by a surge hydraulic pressure or the like produced upon completion of the piston stroke and affects a shock, does not occur when the piston stroke ends. The decision on the end of the piston stroke is made using a timer. Therefore, the time to be set in the timer will be given leeway so that the piston stroke surely ends.

Under the interchange shift control after the completion of the piston stroke control, the end of the piston stroke control is determined using the timer, and the hydraulic pressure is increased under an open control along such an interchange slope as to make the pull-in slope of the torque phase adequate. Subsequently, the control for raising the pressure to a shelf pressure from the beginning of the inertia phase is executed. The beginning of the inertia phase is linked to the lower limit value of the shelf pressure from the beginning of the inertia phase.

Next, a shelf pressure control for controlling the shelf pressure is performed. The height of the shelf pressure is determined in such a way that the time for the inertia phase becomes adequate. A shelf pressure slope (slope of the shelf pressure) is determined by data for each vehicle speed.

In a maximum pressure (MAX) control subsequent to the above, when the end of the inertia phase is detected, the pressure is increased along a predetermined slope for a predetermined time, and thereafter rises to the maximum pressure MAX.

In this case, therefore, the control of the hydraulic fluid pressure for the engaging-side frictional element is carried out in the order mentioned above.

When the sequence of processes starting at step 121 is selected as a result of the decision in the step 101, in the exemplified program, a larger one of the hydraulic pressure needed for ending the piston stroke within a predetermined time and the hydraulic pressure corresponding to the necessary volume is output, and the following processes are executed to aim at ending the piston stroke within the intended time and securing the necessary volume after the piston stroke ends.

The hydraulic pressure (pressure A which is indicated by A in FIGS. 5A and 5B) needed for ending the piston stroke to end within a predetermined time is calculated in step 121 and the necessary volume (pressure B which is indicated by B in FIGS. 5A and 5B) is calculated in the next step 122.

Figure 5A:
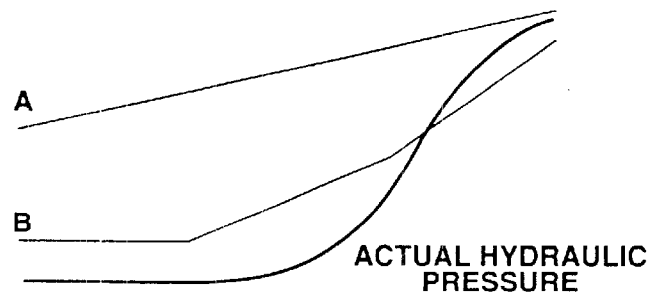
FIG. 5A is an explanatory graph showing a mode of the relationship between the command pressure for terminating the piston stroke within a necessary time and the command pressure for securing the necessary volume of the hydraulic fluid to be supplied to the engaging-side frictional element, used in the shift control system of FIG. 1.
Figure 5B:
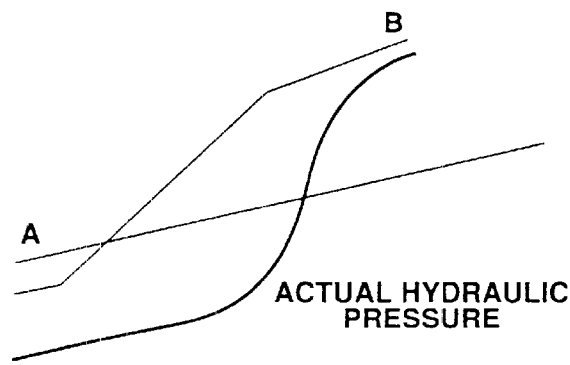
FIG. 5B is an explanatory graph similar to FIG. 5A but showing another mode of the relationship between the command pressure for terminating the piston stroke within a necessary time and the command pressure for securing the necessary volume of the hydraulic fluid to be supplied to the engaging-side frictional element, used in the shift control system of FIG. 1.

In the next step 123, the thus obtained pressures A and B are compared with each other to determine if the pressure B is higher than the pressure A. When the result of the decision is NO (pressure A≧pressure B), the command value ($P_c$) for the engaging-side frictional element is set equal to the pressure A in step 124 (FIG. 5A or part of FIG. 5B). When the result of the decision is YES (pressure B>pressure A), the command value ($P_c$) for the engaging-side frictional element is set equal to the pressure B in step 125 (FIG. 5B).

Figure 9:
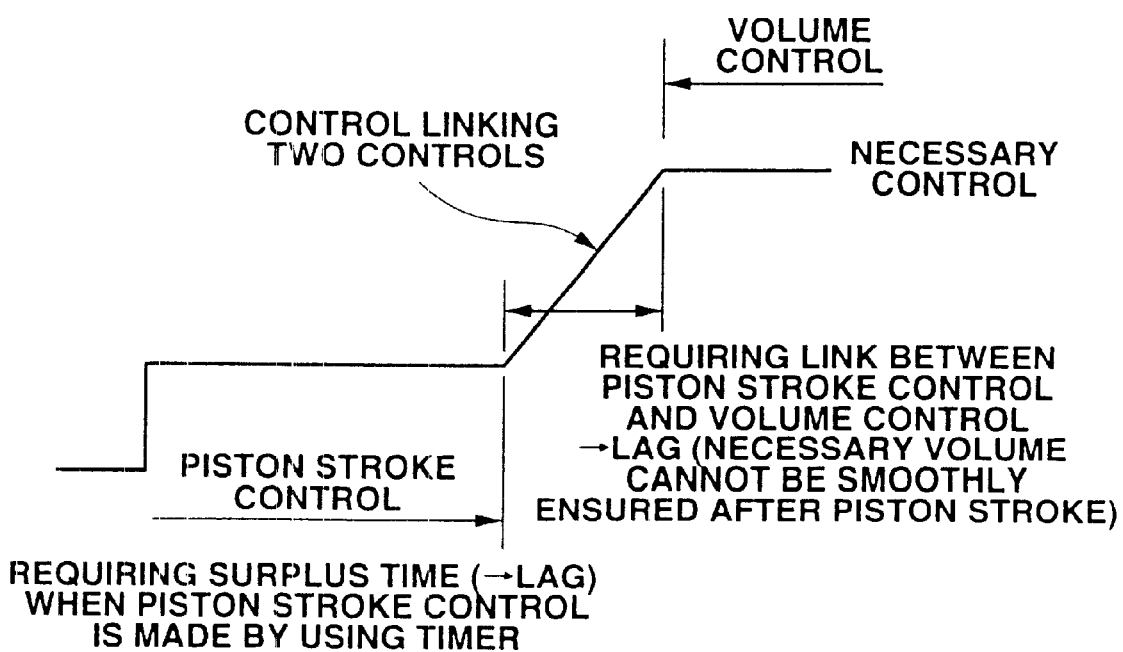
FIG. 9 is an explanatory graph showing the relationship between a piston stroke control and a volume control, provided for reference to explain the problems to be solved by the present invention.

The conventional technique suffers significant shortcomings mentioned below because the conventional technique does not employ the idea of the invention which can adequately and selectively use the engaging-side control in the down-shift mode depending on whether or not the shift is the drive shift and independently and sequentially executes the piston stroke control and the volume control in the down-shift mode regardless of whether or not the shift is the drive shift. First, the hydraulic pressure cannot be raised to the necessary volume immediately after the piston stroke control ends (the slope to link the piston stroke control and the volume control is always needed), so that the necessary volume cannot be secured promptly after the completion of the piston stroke due to the link control needed (FIG. 9). Further, because the end of the piston stroke cannot be estimated accurately, a timer is used to estimate the end of the piston stroke and the piston stroke control is finished based on the estimated time. Accordingly, the time to be set in the timer will be given leeway, thus producing a wasteful time. This is disadvantageous to a quick response demanded. The conventional technique therefore hardly meets the demand for the control of the engaging-side frictional element in the step-down mode that demands a quick response (or has a difficulty in meeting the demand of making the response quicker even by 0.1 sec). By way of contrast, the illustrated program of the present invention can calculate (A) the "command pressure needed for ending the piston stroke within the intended time" and (B) the "command pressure needed to secure the necessary volume" in parallel (simultaneously) and select a larger one as the final command pressure. This makes it possible to always finish the piston stroke within the intended time and promptly secure the necessary volume after the completion of the piston stroke at the same time.

In the processes of executing the piston stroke control and the volume control after the sequence of processes starting at step 111 is selected, learning or the like takes place independently in each process. Even in the case where the sequence of processes starting at step 121 is selected, if the two pressures are calculated in parallel, and a proper one is finally decided in the above-described manner, the mentioned feature can be used advantageously. When desired, therefore, learning and correction for a low-temperature condition can be carried out independently in the calculations (A) and (B) (step 121 and step 122), so that both aims (A) and (B) can be achieved automatically.

FIG. 5 shows typical two cases of the transition including an increase in actual hydraulic pressure (the case of A>B and the case where the level relation is reversed and becomes B>A). In the case of FIG. 5A, it is apparent that the actual hydraulic pressure exceeds the pressure B and rises to or above the necessary volume after the completion of the piston stroke in the process of rising. In the case of FIG. 5B, it is apparent that the actual hydraulic pressure promptly rises to the necessary volume after the piston stroke ends and because of B>A, finishing the piston stroke within the intended time is of course guaranteed.

In the case of FIG. 5A, the hydraulic pressure becomes equal to or greater than the necessary volume after the piston stroke ends, i.e., a volume more than the necessary volume is generated as a consequence. If the command value is smaller than the illustrated value, however, it is possible to fail to fulfill the premise that the piston stroke is finished within a predetermined time and the volume is generated within the intended time. In view of this point, the behavior of the actual (hydraulic) pressure is to be allowable. That is, the fact that the actual pressure does not exactly become the volume having a target value is tolerable in order to avoid a considerable problem (such that as a result of the piston stroke failing to end within a predetermined time, no volume can be provided at the time the volume is needed).

Returning to FIG. 4, in the case where the sequence of processes starting at step 121 is selected as a result of the decision in step 101, one of the command pressures acquired in steps 121 and 122 which is set in either step 124 or step 125 based on the decision made in step 123 is applied, as the final command pressure of the engaging-side hydraulic pressure, to the control of increasing the hydraulic fluid pressure with respect to the engaging-side frictional element to thereby ensure the adequate engaging-side control.

As the above-described control can adequately and selectively change the engaging-side control even in the down-shift mode depending on whether or not the shift is the drive shift or the down-shift and can control the shift more precisely, resulting in an improved applicability, it is a good solution to the conventional problems from the view points of the considering matters A to D discussed in the Description of the Prior Art of the specification.

In determining the command pressure for engaging in down-shift mode, the control can be switched or changed depending on whether the turbine torque is in the drive mode or the coast mode (step 101). In the down-shift mode in the case where the sequence of processes starting at step 111 is selected and the progressing speed of the shift is controlled mainly by the volume of the hydraulic fluid to be supplied to the engaging-side frictional element (the above-described case I), the piston stroke control and the volume control can be executed in the order mentioned (steps 111–117). In the down-shift mode in the case where the sequence of processes starting at step 121 is selected and the shift progresses regardless of the volume of the hydraulic fluid to be supplied to the engaging-side (the above-described case II), the command hydraulic pressure which guarantees that "the piston stroke ends within a predetermined time" is set to the lower limit value as shown in FIG. 6 so that the volume control can be carried out immediately after the shift is determined (steps 121–125).

Figure 8:
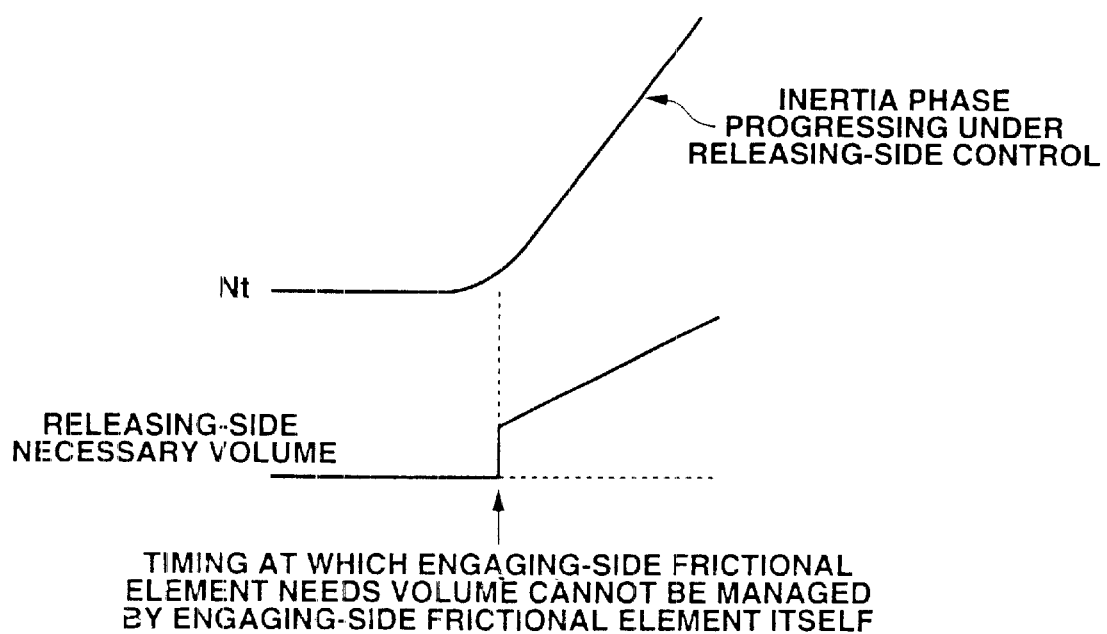
FIG. 8 is an explanatory graph showing the relationship between the number of rotation (per unit time) of a turbine of a torque converter and the necessary volume of the hydraulic fluid to be supplied to an engaging-side frictional element, provided for reference to explain the problems to be solved by the present invention.

FIG. 6 shows the relationship among the hydraulic pressure (=the lower limit value) which guarantees the termination of the piston stroke (step 121), the necessary volume (it is not known at what timing the necessary volume becomes large) (step 121) and the final command pressure or value (step 124 or 125). Even if it is not known at what timing the necessary volume becomes large or when the volume of the hydraulic fluid to be supplied to the frictional element becomes necessary (see FIG. 8), the mentioned final command pressure can be set as the command pressure. This makes it possible to finish or terminate the piston stroke within a predetermined time and promptly raise the hydraulic pressure to or above the necessary volume after the completion of the piston stroke at the same time.

The control according to the present invention well meets the performances or the like that are demanded for the engaging-side hydraulic pressure in the drive-down shift mode already considered in the foregoing description. While the control illustrated in FIG. 9 cannot cope with a possible case where the volume becomes necessary during piston stroke control, cannot avoid producing a wasteful time and is thus unsuitable for the shift that demands a quick response, the control of the invention has the following advantages.

As the "hydraulic pressure that guarantees the end of the piston stroke within a predetermined time" is set to the lower limit value, the piston stroke can certainly be finished within the intended time. As the volume control is always carried out, the necessary volume can be secured instantaneously as long as the piston stroke ends. If the necessary volume becomes large early, the commanded hydraulic pressure becomes large too, so that the piston stroke ends faster, resulting in faster securing of the volume. Even if the necessary volume falls during the volume control, the piston stroke does not return.

Figure 7:
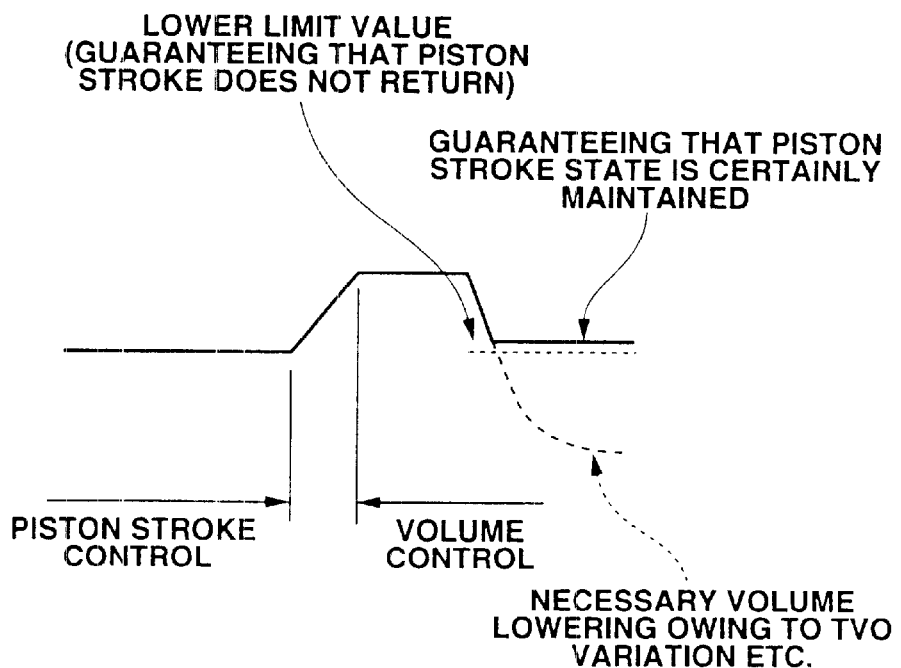
FIG. 7 is an explanatory graph similar to FIG. 5A but showing a control manner for securing that the piston stroke in the engaging-side frictional element is certainly maintained during the volume control.

FIG. 7 exemplifies the case where if the necessary volume decreases due to a change or the like in, for example, the throttle opening degree TVO, the piston stroke state is always ensured with the lower limit value (that guarantees that the piston stroke does not return).

Even in the case where the progressing speed of the shift is controlled mainly by the volume of the engaging-side frictional element (the case I), therefore, the "lower limit value which ensures that the piston stroke state is maintained" may be provided during the volume control so that the piston stroke which has been completed once can be prevented from returning even when the necessary volume decreases. It will be understood that the control of the present invention may be carried out in the above manner It will be appreciated that the present invention is not limited to the above embodiments or modes. Although the foregoing description of the embodiment has been given of the case where the automatic transmission is of the directly valve-actuating type wherein the hydraulic fluid pressures of the frictional elements to be controlled are directly regulated by the individual solenoids, it will be understood that the invention is not limited to this particular type of automatic transmission but may be adaptable to other types of automatic transmissions as well along the same line of thought and can demonstrate similar advantages in the latter case.

What is claimed is:

1. A shift control system for an automatic transmission, comprising:

a plurality of frictional elements including at least an engaging-side frictional element which is able to make a shift for the automatic transmission upon being engaged by increasing a hydraulic pressure of a hydraulic fluid to be supplied to the engaging-side frictional element; and a controller programmed to carry out changing a control for engaging the engaging-side frictional element between in a first condition in which a speed of progression in the shift is managed mainly in accordance with a volume of the hydraulic fluid to be supplied to the engaging-side frictional element itself and in a second condition in which the shift progresses regardless of the volume of hydraulic fluid to be applied to the engaging-side frictional element itself, and accomplishing a volume control for the engaging-side frictional element from a timing immediately after a decision of the shift under a command hydraulic pressure of the hydraulic fluid to be supplied to the engaging-side frictional element in the second condition, the command hydraulic pressure having a lower limit value for securing that a piston stroke of the engaging-side frictional element completes within a predetermined time.

2. A shift control system as claimed in claim 1, wherein the changing the control is made in accordance with a first state in which a turbine torque of a torque converter is in a drive mode and a second state in which the turbine torque is in a coast mode.

3. A shift control system as claimed in claim 2, wherein a piston stroke control is made before the volume control in the first condition, the piston stroke control being for the engaging-side frictional element and accomplished under a command hydraulic pressure of the hydraulic fluid to be supplied to the engaging-side frictional element.

4. A shift control system as claimed in claim 3, wherein said controller is programmed to further carry out accomplishing a volume control for the engaging-side frictional element under a command hydraulic pressure of the hydraulic fluid to be supplied to the engaging-side frictional element in the second condition, the command hydraulic pressure having a lower limit value for securing that a piston stroke state of the engaging-side frictional element is maintained in the volume control so as to secure maintenance of the piston stroke state even if a necessary volume of the hydraulic fluid to be supplied to the engaging-side frictional element is reduced.

5. A shift control system for an automatic transmission, comprising:

a plurality of frictional elements including at least an engaging-side frictional element which is able to make a shift for the automatic transmission upon being engaged by increasing a hydraulic pressure of a hydraulic fluid to be supplied to the engaging-side frictional element; and a controller programmed to carry out determining that the automatic transmission is in a first condition in which a speed of progression in the shift is managed mainly in accordance with a volume of the hydraulic fluid to be supplied to the engaging-side frictional element itself, determining that the automatic transmission is in which the shift progresses regardless of the volume of hydraulic fluid to be applied to the engaging-side frictional element itself, applying a first control and a second control for engaging the engaging-side frictional element respectively in the first condition and the second condition, the first and second controls being different from each other and changed over from one to the other, setting a lower limit value of a command hydraulic pressure of the hydraulic fluid to be supplied to the engaging-side frictional element, the engaging-side frictional element is engaged under the command hydraulic pressure, the lower limit value securing that a piston stroke of the engaging-side frictional element completes within a predetermined time, and accomplishing a volume control for the engaging-side frictional element from a timing immediately after a decision of the shift under the command hydraulic pressure of the hydraulic fluid in the second condition.

* * * * *